UNITED STATES PATENT OFFICE.

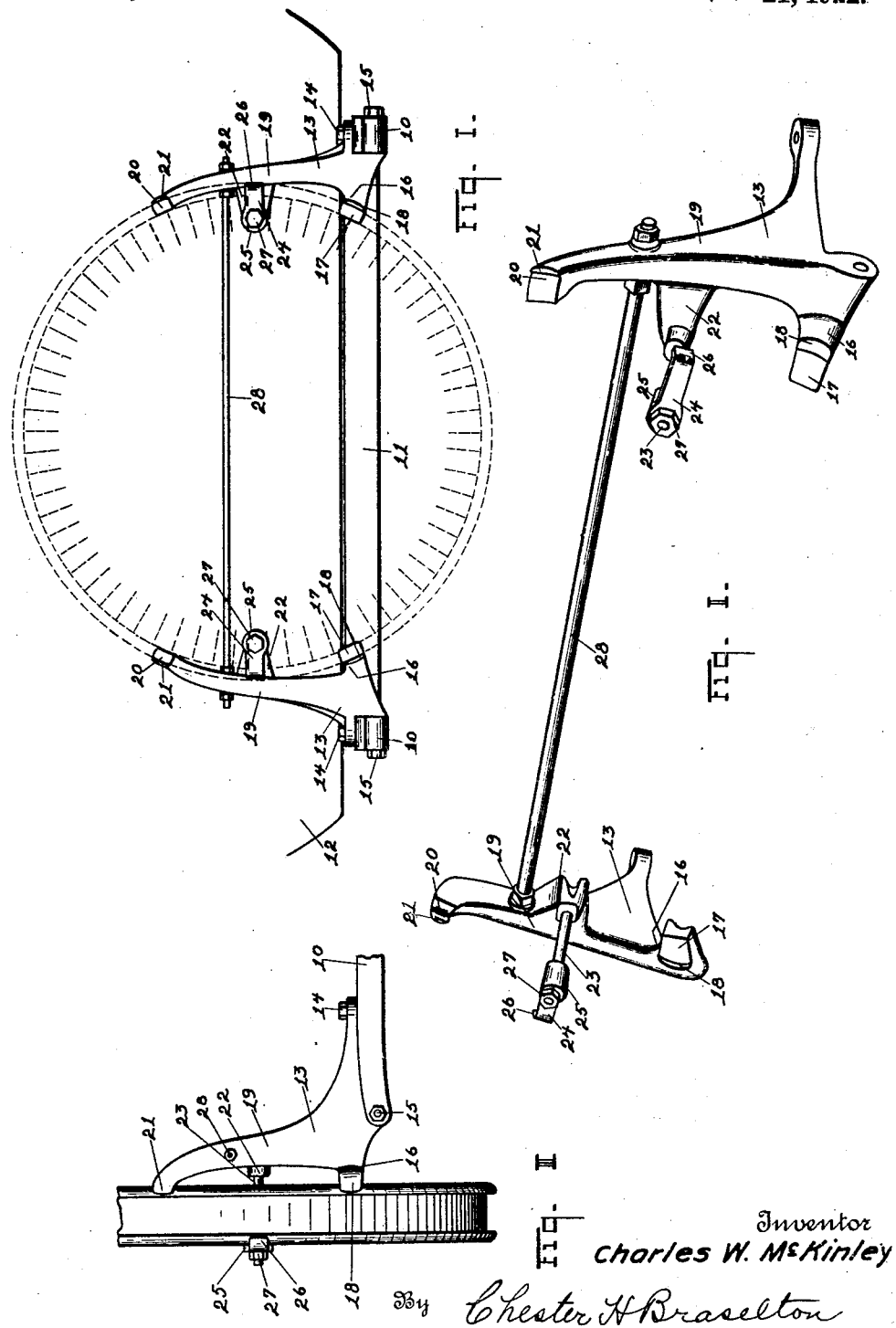

CHARLES W. McKINLEY, OF TOLEDO, OHIO, ASSIGNOR TO THE WILLYS-OVERLAND COMPANY, OF TOLEDO, OHIO, A CORPORATION OF OHIO.

CARRIER FOR SPARE RIMS OR WHEELS.

1,410,107.  Specification of Letters Patent.  Patented Mar. 21, 1922.

Application filed October 13, 1917. Serial No. 196,485.

*To all whom it may concern:*

Be it known that I, CHARLES W. McKINLEY, a citizen of the United States, residing at Toledo, in the county of Lucas and State of Ohio, have invented certain new and useful Improvements in Carriers for Spare Rims or Wheels, of which I declare the following to be a full, clear, and exact description.

This invention relates to improvements in carriers for spare rims or wheels and more particularly to that class of carriers which function by gripping the rim on which the tire is supported.

The principal object of this invention is to provide an improved carrier, which may be very cheaply and economically constructed, and which affords a very strong and efficient support for a spare rim or wheel, and one in which the spare rim or wheel may be very quickly and easily dismounted from the carrier. A further object of my invention is to provide an improved carrier, which is equally adaptable for use with spare rims or spare wheels.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing forming a part of this specification, in which:

Fig. I is a view in rear elevation of a carrier constructed in accordance with my invention, a wire wheel being shown in place by dotted lines.

Fig. II is a perspective view of a carrier constructed in accordance with my invention; and Fig. III is a view in side elevation of my improved carrier showing a demountable rim supported in place therein.

In the drawings, similar reference numerals refer to similar parts throughout the several views.

Considering the numbered parts of the drawing, I have shown a part of a motor vehicle comprising the side members 10 of the frame, the rear cross member 11 and the body 12, supported thereon. A bracket 13 is bolted, or otherwise secured, to the rear end of each side member 10, said bracket being bolted in place by means of the bolts 14 and 15. Each bracket 13 is provided with an arm 16, which extends rearwardly and inwardly, with reference to the center line of the vehicle frame, and is provided at its rear end with a rim seat 17, having a lateral flange 18. The seat 17 is adapted to engage the edge of the rim, whether the same is a demountable rim or the rim of a demountable wheel, and the flange 18 prevents lateral movement of said rim relative to the seat. The seat 17 forms a support for the rim. The bracket 13 is also provided with an arm 19, which extends upwardly and inwardly, with reference to the center line of the vehicle frame, and is provided at its upper end with a rim seat 20, which is adapted to engage the edge of the rim, and a lateral flange 21, which is provided to prevent lateral movement of the rim on the seat. The arms 16 and 19 are so disposed relative to each other and the seats 17 and 20 are so formed, that both of these seats are on the arc of a circle formed by the center of the rim or wheel which is supported in the carrier.

Midway between the arm 16 and the end of the arm 19, an arm 22 projects from the arm 19 laterally and inwardly towards the center line of the vehicle frame. This arm 22 carries a bolt 23 on the rear end of which is mounted a lug 24, having a boss 25 through which the bolt 23 extends. The lug 24 is held in place on the bolt 23 by means of the nut 27, threaded on the end thereof. The free end of the lug 24 has a flange 26, which is adapted to engage the edge of a rim, as shown in Fig. III.

As I have heretofore stated, I provide two of these brackets, one of which is secured to the end of each of the side members 10 of the frame, and these brackets are so arranged that the arms 19 and 16 of opposite brackets extend towards each other, and the flanges 21 and 18 on the seats 20 and 17 face towards each other. These brackets are connected together by the brace rod 28.

From the description of the parts given above, the operation of this device should be very readily understood. From inspection of Fig. III of the drawing, it will be seen that the rim or wheel when in place in the carrier is engaged on one edge by the seats 17 and 20 of each bracket and on the other edge by the lugs 24. The flanges 18, 21 and 26 on the seats 17 and 20, and the lugs 24, respectively, serve to prevent lateral movement of the rim or wheel relative to the bracket, and the nuts 27 on the threaded ends of the bolts 23 may be drawn tight to force the lugs 24 against the edge of the rim opposite that which the seats 20 and 17 engage, so as to firmly seat the rim or wheel on the carrier. It will also be seen that the seats 17 and 20 engage the rim on opposite sides of the horizontal diameter of the rim, so that vertical movement of the rim relative to the brackets is prevented. Movement axially of the rim is prevented by means of the lugs 24, and a lateral movement is prevented by means of the flanges before mentioned.

It will be apparent that the rim may be removed from the carrier by unscrewing the nuts 27 sufficiently to permit the lugs 24 to be turned to one side, and in Fig. II I have shown these lugs in operative position. In removing the rim it is only necessary to turn the lugs so that they will be out of engagement with the rim, when the rim can be easily removed by a straight axial movement thereof.

In mounting the rim in place, all that is necessary to do is to place the rim in contact with the seats 17 and 20, of the bracket, swing the lugs 24 around until they engage the opposite edge of the rim, and secure these lugs in place by screwing up the nuts 27. This securely holds the rim or wheel in place on the carrier.

I am aware that the particular embodiment of my invention, which I have here shown, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is—

1. The combination with a vehicle frame, of a pair of brackets secured thereto, each of said brackets being adapted to engage a rim at separated points thereon above and below the horizontal diameter of the rim; and a member carried by each bracket and movable relative thereto, adapted to engage the opposite edge of said rim at a point between said first mentioned points.

2. A device of the class described, comprising the combination of a pair of brackets, each provided with a pair of arms having separated engaging faces for engaging one edge of a rim above and below the horizontal diameter of the rim; and a lug carried by each bracket, between said arms, to engage the opposite edge of the rim from said faces.

3. A device of the class described, comprising the combination of a pair of brackets, each bracket having an arm extending rearwardly therefrom and provided with a rim engaging seat; an arm extending upwardly therefrom and provided with a rim engaging seat; and an arm extending from between the two said last-named arms and carrying a bolt; lugs removably mounted on said bolt and adapted for engagement with the rim; and removable means for retaining said lugs on said bolts.

4. A device of the class described comprising the combination with a vehicle frame, of a pair of brackets secured thereto, each of said brackets being formed to contact with the exterior surface of the rim to be supported at two separate points on one side thereof and upon opposite sides of the diameter, and means supported by each bracket and extending transversely therefrom for engaging the opposite edge of the rim between the points where the rim contacts with the bracket.

5. A device of the class described comprising the combination with a vehicle frame, of a pair of brackets secured thereto, each of said brackets being formed to contact with the exterior surface of the rim to be supported at two separate points on one side thereof and upon opposite sides of the diameter and means supported by each bracket for engaging the opposite edge of the rim between the points where the rim contacts with the bracket.

6. A device of the class described comprising the combination with a vehicle frame, of a bracket secured to the rear end of each side member thereof, each of said brackets having a lower arm extending rearwardly and inwardly; an upper arm extending upwardly and inwardly, and a central arm extending inwardly; a bolt carried by each of said central arms and extending rearwardly therefrom; a lug on the end of each bolt and provided with a flanged end; and a nut threaded on the end of each bolt, said upper and lower arms having flanged rim seats.

7. The combination with a vehicle frame, of a pair of brackets, each provided with a tire supporting seat, an upwardly extending arm carried by each bracket and adapted to engage the rim at a point separate from said seat, and a member carried by each bracket and movable relative thereto adapted to engage the opposite edge of said rim from the said seat and arm at a point intermediate said seat and arm.

8. A device of the class described comprising the combination of a pair of brackets each provided with a pair of arms having separated engaging faces for engaging a rim above and below the horizontal diameter of the rim, a lug carried by each bracket between said arms to engage the opposite edge of the rim from said faces, and a brace rod connecting said arms.

In testimony whereof I affix my signature.

CHARLES W. McKINLEY.